(12) United States Patent
Saarela et al.

(10) Patent No.: US 6,366,785 B2
(45) Date of Patent: Apr. 2, 2002

(54) TELEPHONE SERVICES

(75) Inventors: Juha Saarela, Tampere; Esa Eteläperä, Lempäälä ; Maini Williams, Tampere, all of (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,345

(22) Filed: Dec. 30, 1998

(30) Foreign Application Priority Data

Jan. 7, 1998 (FI) .................................. 980022

(51) Int. Cl.[7] ................................ H04Q 7/20
(52) U.S. Cl. ............... 455/466; 379/212.01; 379/88.26
(58) Field of Search ............................ 379/88.1, 88.12, 379/88.13, 88.22, 88.23, 88.26, 211, 212; 455/414, 466

(56) References Cited

U.S. PATENT DOCUMENTS

| | | | |
|---|---|---|---|
| 5,189,632 A | 2/1993 | Paajanen et al. | 364/705.05 |
| 5,257,257 A | 10/1993 | Chen et al. | 370/18 |
| 5,353,328 A | 10/1994 | Jokimies | 379/58 |
| 5,392,282 A | 2/1995 | Kiema | 370/77 |
| 5,535,264 A | 7/1996 | Starr et al. | 379/89 |
| 5,657,371 A | 8/1997 | Suomi et al. | 455/418 |
| 5,684,873 A | 11/1997 | Tiilikainen | 379/354 |
| 5,710,810 A | 1/1998 | Tiilikainen | 379/355 |
| 5,724,410 A * | 3/1998 | Parvulescu et al. | 379/88.18 |
| 5,778,052 A | 7/1998 | Rubin et al. | 379/89 |
| 5,790,875 A | 8/1998 | Andersin et al. | 395/750.03 |
| 5,790,957 A | 8/1998 | Heidari | 455/553 |
| 5,802,465 A | 9/1998 | Hamalainen et al. | 455/403 |
| 5,827,082 A | 10/1998 | Laine | 439/165 |
| 5,894,504 A * | 4/1999 | Alfred et al. | |
| 5,966,651 A * | 10/1999 | Sibecas | 455/412 |
| 6,064,876 A * | 5/2000 | Ishida et al. | |
| 6,094,475 A * | 7/2000 | Kang | 379/84 |

FOREIGN PATENT DOCUMENTS

EP 0 639 018 A3 2/1995
WO WO 98/38782 9/1998

* cited by examiner

Primary Examiner—Curtis Kuntz
Assistant Examiner—Barry W Taylor
(74) Attorney, Agent, or Firm—Perman & Green, LLP

(57) ABSTRACT

A method of recording and delivering a voice message from a calling telephone (1) to a called telephone (2) in the event that the called telephone (2) cannot be reached. A voice message (12) is recorded at the calling telephone (1) and is stored there until the calling telephone (1) receives a message (10) from the telephone network (3) that the called telephone (2) can now be reached. Upon receipt of this message (10), the calling telephone (1) initiates a call to the called telephone (2) and replays the recorded message (14) over the open voice channel.

9 Claims, 1 Drawing Sheet

TELEPHONE SERVICES

FIELD OF THE INVENTION

The present invention relates to telephone services and in particular to telephone services in which a message may be recorded, for subsequent playback, when a called telephone device cannot be reached.

BACKGROUND OF THE INVENTION

Telephone answering services which enable a recorded message to be left when a called telephone cannot be reached (e.g. it is busy, unanswered, or switched off) are generally made available in one of two ways. Firstly, the telephone itself may have integrated thereinto, or may be directly connected to, a voice recorder such as a tape cassette recorder or a solid state memory recorder. When a third party makes a call to the telephone, and for example the call is unanswered, the caller is connected to the voice recorder and is able to leave a message. The second way in which an answering service may be made available is to provide a voice recorder in the telephone network. Each subscriber to the network has assigned to him a "voice mailbox". In the event that the called telephone cannot be reached, the caller is connected to the voice mailbox where a voice message can be left. When the called telephone becomes free, or is switched on, a message is forwarded to the telephone from the network to notify the subscriber that there is a message in his mailbox. The subscriber can then call a mailbox number to listen to the recorded message. This second option is preferred in the case of cellular telephone networks as it allows a message to be left even if a voice channel cannot be opened to the called telephone.

SUMMARY OF THE INVENTION

According to a first aspect of the present invention there is provided a voice communication method comprising:

initiating a telephone call from a first to a second telephone device;

in the event that a voice channel cannot be opened between the first and second telephone devices, recording a voice message at the first telephone device; and subsequently transmitting said recorded message directly from the first to the second telephone device without necessarily requiring further user input.

The term "directly" used above indicates that, whilst the recorded message is transmitted from the first to the second telephone device via the telephone network, the message is not stored in a voice mailbox assigned to the second telephone device. It will also be appreciated that the subsequent transmission of the recorded message is carried out automatically by the first telephone device in co-operation with the telephone network and the second telephone device.

In one embodiment of the present invention, the method comprises transmitting a message from the network, to which the first telephone device subscribes, to the first telephone device to notify the first device when a voice channel can be opened to the second device and in response to this notification opening a voice channel between the two devices and transmitting said recorded message. The recorded message is held in a "document outbox" of the first telephone device until the voice channel becomes available. Where the first telephone device is a cellular telephone subscribing to a GSM cellular telephone network, said notification may be made by way of a Completion of Call on Busy Subscriber (CCBS) message.

In a second embodiment of the present invention, where both the first and second telephone devices are cellular telephones and subscribe to the same or different cellular telephone networks, the recorded message is converted at the first device into a data signal and is transmitted to the second device over a signalling channel or channels. The data signal is received by the second device over said signalling channel(s) where it is converted back to a voice signal for subsequent playback. Where the telephone devices both subscribe to a GSM cellular telephone network, said data signal may be transferred as a short message service (SMS) message or a set of concatenated SMS messages.

Embodiments of the present invention may comprise transmitting a pre-recorded voice message (e.g. a voice header) together with said recorded message from the first to the second device. Alternatively, or in addition, the method may comprise transmitting a text message together with said recorded message.

According to a second aspect of the present invention there is provided a telephone device comprising;

telephone call initiating means for initiating a call to another telephone device;

detection means for detecting when a voice channel cannot be opened to the called telephone device;

recording means for recording a voice message; and transmitting means for automatically transmitting the recorded message directly to the called telephone device.

In one embodiment of the invention, the telephone device comprises means for receiving a notification signal from the network to which the device subscribes indicating that a voice channel can be opened to the called telephone device, said transmitting means being responsive to said notification signal to open a voice channel to the called telephone device and to transmit the recorded message over that channel.

In an alternative embodiment, the telephone device is a cellular telephone and comprises signal processing means for converting the recorded voice message into a data signal which can be sent to the called telephone device over a signalling channel or channels. Where the telephone device subscribes to a GSM network, said signal processing means may be arranged to transmit the recorded message as an SMS message or as a set of concatenated SMS messages.

According to a third aspect of the present invention there is provided a voice communication method comprising:

initiating a telephone call from a first to a second telephone device;

in the event that a voice channel cannot be opened between the first and second telephone devices, recording a voice message at the first telephone device;

transmitting a message from the telephone network to the first telephone device to indicate when a voice channel can be opened to the second telephone device;

opening a voice channel from the first telephone device following receipt of said message; and subsequently transmitting said recorded message to the second telephone device over the open voice channel.

According to a fourth aspect of the present invention there is provided a voice communication method comprising:

initiating a telephone call from a first to a second telephone device;

in the event that a voice channel cannot be opened between the first and second telephone devices, recording a voice message at the first telephone device;

converting the recorded message into a data message or set of data messages; and transmitting the data message(s) to the second telephone device over a signalling channel or channels.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
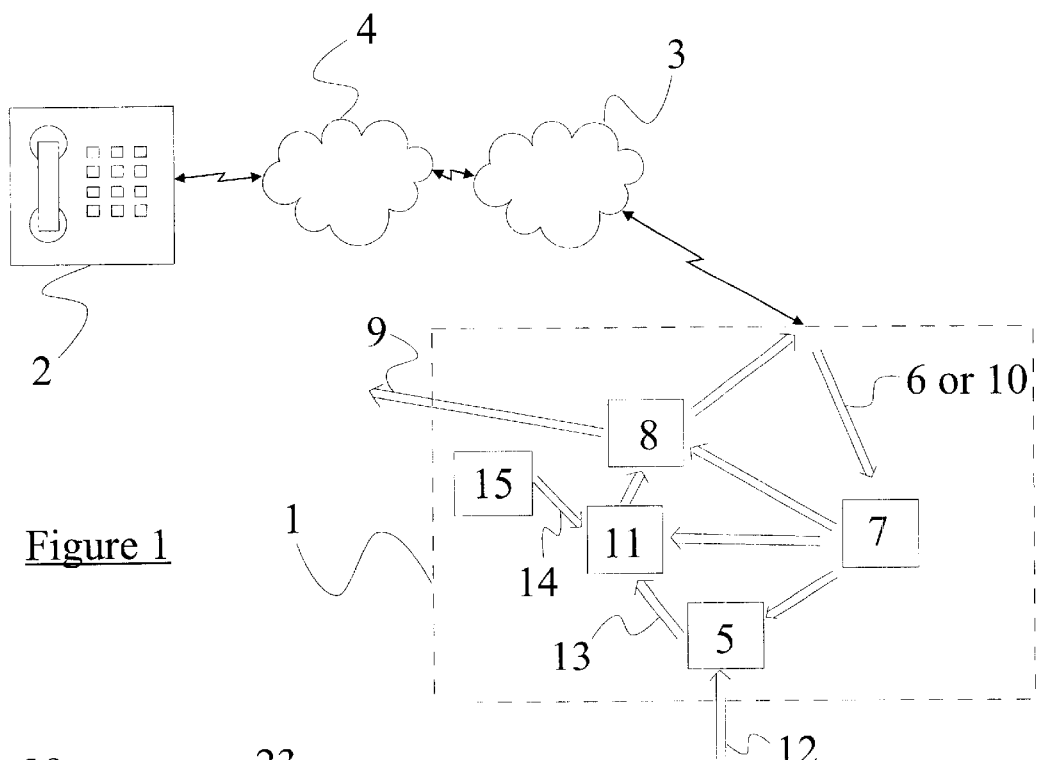
FIG. 1 shows schematically a telephone system according to a first embodiment of the present invention.

With reference firstly to FIG. 1, there is illustrated a telephone system in which a cellular telephone 1 is able to communicate with a fixed line telephone 2 via a GSM cellular network 3 and a public switched telephone network (PSTN) 4. Whilst the fixed line telephone may be a conventional telephone, the cellular telephone 1 is provided with internal voice recording means 5. This is typically a semiconductor memory or a part of a semiconductor memory which is able to store a voice message in digital form. A message may be converted into such a digital form by a standard analogue to digital converter (not shown) of the cellular telephone 1.

The telephone system is best described by explaining the operation thereof. When a user initiates a voice call from the cellular telephone 1 to the fixed line telephone 2, a voice channel can only be opened between the two telephones if the called telephone is switched on, not busy, and answered. In the event that a voice channel cannot be opened, this is detected by the GSM network 3 and a signalling message 6 is sent from the network 3 to the cellular telephone 1 advising the cellular telephone 1 of this situation.

This message 6 is received by the cellular telephone 1 and is conveyed to a controller 7. The controller 7 then triggers a sound transport driver 8 to play a pre-recorded message 9 to the caller, which message states "your call cannot be connected—please leave a message after the tone"—or something similar. The voice recording means 5 is then activated and the message 12, if any, spoken by the user is recorded. The recorded message 13 is then transferred to a document outbox 11.

When the called telephone subsequently becomes free, for example the user hangs-up from an earlier call, this is detected by the PSTN 4 and the GSM network 3. A CCBS (Completion of Call on Busy Subscriber) message 10 is then sent from the GSM network 3 to the cellular telephone 1, where it is received by the controller 7, to advise the cellular telephone 1 that a voice channel can now be opened to the called telephone 2. The controller 7 then initiates a voice call to the called telephone 2 to establish a voice channel. When the called telephone 2 is answered, the controller 7 instructs the document outbox 10 to play the recorded message 13, through the sound transport driver 8, onto the voice channel.

As an additional feature, the controller 7 is able to add a pre-recorded "header" message 14 (held in memory 15) to the user recorded message 13 stored in the document outbox 11. The header 14 may say, for example, "this is a recorded message from Mr. Smith recorded at 12.15 p.m". A pre-recorded "footer" message may also be added, e.g. "end of message".

The controller 7 of the cellular telephone 1 is able to receive DTMF commands, sent from the called telephone 2 when a voice channel is open. These commands may be used to pause the playback of the recorded message 13, or to replay the message from the start. A header or footer added to the recorded message may contain instructions to the called subscriber as to the use of the DTMF signals, e.g. "press 1 for pause, press 2 to repeat the message . . .".

Figure 2:
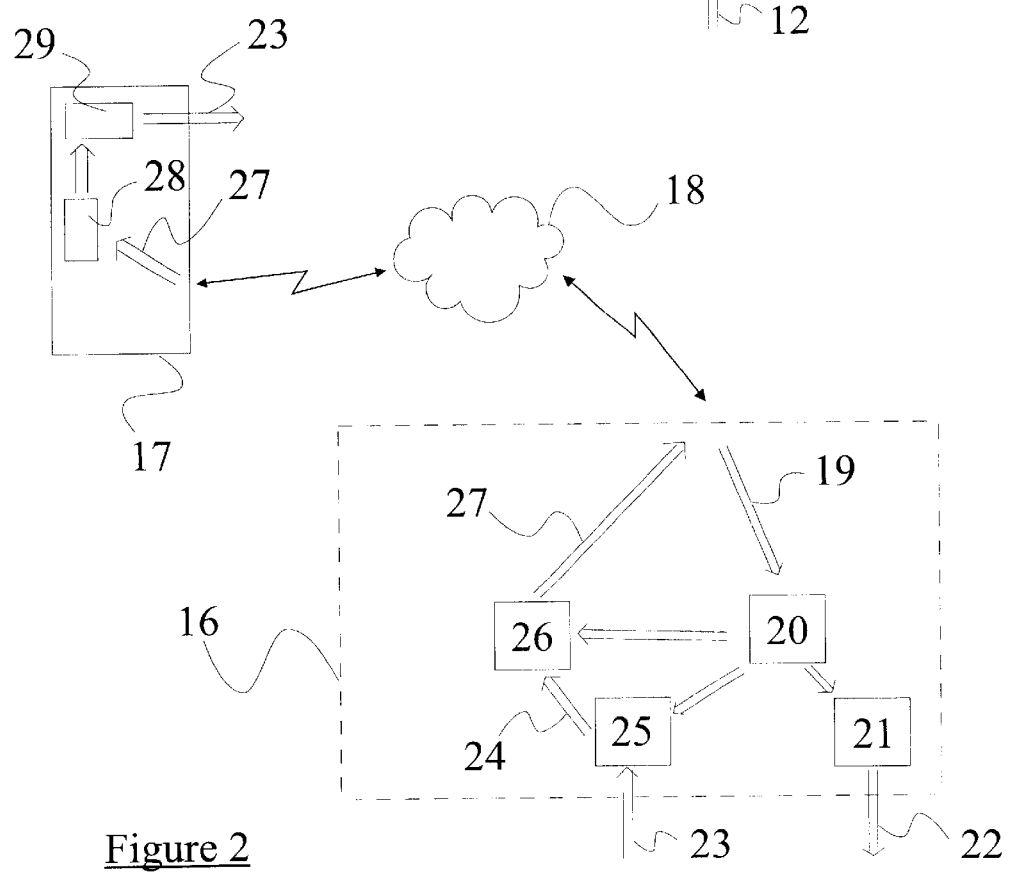
FIG. 2 shows schematically a telephone system according to a second embodiment of the present invention.

FIG. 2 shows a second embodiment of the present invention. In this embodiment, as will be explained below with reference to the operation of the telephone system, both the calling telephone 16 and the called telephone 17 are digital cellular telephones subscribing to a GSM cellular telephone network 18.

When a telephone call is initiated from the calling telephone 16 to the called telephone 17, a message 19 is transmitted from the GSM network 18 to the calling telephone 16 in the event that a voice channel cannot be opened to the called telephone 17. Again, a controller 20 of the telephone 16 responds to receipt of this message 19 by instructing a sound transport driver 21 to play a message 22 advising the caller that the called telephone 17 cannot be reached but that a message 23 can be recorded for the called subscriber. If the caller chooses to record a message 23, this message is converted into digital form 24 by a voice recorder 25 and is transferred to a document outbox 26. The voice data 24 is then organised by the controller 20 into a form suitable for transmission via the GSM short message service (SMS). Typically, the data will be organised into a set of concatenated SMS messages 27. These messages can then be transmitted in a known way over signalling channels from the calling telephone 16 to the called telephone 17. As the SMS messages are transmitted over signalling channels, the SMS "voice" messages 27 can be transmitted even if the called telephone 17 is busy.

The messages 27 once received at the called telephone 17 are stored in a document "inbox" 28 of the telephone 17. This prompts a message to appear on a display (not shown) of the called telephone 17 to advise the called subscriber that an SMS "voice message" has been received. The subscriber can then interrupt his current call to listen to the voice message, or may listen to the voice message after he has terminated the current call, whereupon a processor and sound driver 29 converts the SMS messages 27 back into the voice message 23 which is played back to the subscriber. It will be appreciated that as the SMS "voice message" is stored at the called telephone 17, the called subscriber can pause or replay the received voice message directly from his telephone 17.

It will be appreciated that modifications may be made to the above described embodiments without departing from the scope of the present invention. For example, the embodiment described with reference to FIG. 2 may be modified so that a header or footer message may be added to the recorded message, in the same way as was described with reference to FIG. 1. The transmitted message may also contain control information, such as a time when the received message should be played to the called subscriber. Rather than sending the voice message as a set of SMS messages, the voice message may be sent in a fax or other suitable data transmission format.

Either of the embodiments described with reference to FIGS. 1 and 2 may be modified to incorporate means for delaying (i.e. setting a specific transmission time), cancelling, or modifying a previously recorded message (providing of course that the message has not already been transmitted).

What is claimed is:

1. A voice communication method comprising:

initiating a telephone call from a first telephone to a second telephone;

in the event that a voice channel cannot be opened between the first telephone and the second telephone, recording a voice message at the first telephone; and subsequently transmitting said recorded message directly from the first telephone to the second telephone without necessarily requiring further user input, and wherein both the first and second telephones are cellular telephones and subscribe to the same or different cellular telephone networks, the method further comprising the steps of:

converting the recorded message at the first telephone into a data signal;

transmitting the data signal to the second telephone over a signaling channel or channels;

receiving the data signal at the second telephone over the signaling channel or channels; and converting the data signal back to a voice signal for subsequent playback.

2. A method according to claim 1, wherein the first telephone and the second telephone subscribe to a GSM cellular telephone network, said data signal being transferred as a short message service (SMS) message or a set of concatenated SMS messages.

3. A method according to claim 1 and comprising transmitting a pre-recorded voice message (e.g. a voice header) together with said recorded message from the first telephone to the second telephone.

4. The method of claim 1 wherein the transmitting of the recorded message from the first telephone to the second telephone is done without user input.

5. A telephone system comprising:

telephone call initiating means for initiating a call from a first telephone to a called telephone;

detection means for detecting when a voice channel cannot be opened to the called telephone;

recording means in the first telephone for recording a voice message in the first telephone as a response for the event that said voice channel cannot be opened, the first telephone further adapted to convert the recorded message into a data signal; and transmitting means in the first telephone for automatically transmitting the recorded message directly to the called telephone over at least one signaling channel and means for receiving the data signal at the second telephone over the signaling channel and converting the data signal back to a voice signal for subsequent playback;

wherein both the first telephone and the called telephone are cellular telephones and subscribe to the same or different cellular telephone networks.

6. A telephone according to claim 5, wherein the telephone subscribes to a GSM network, said signal processing means being arranged to transmit the recorded message as an SMS message or as a set of concatenated SMS messages.

7. A voice communication method comprising:

initiating a telephone call from a caller using a first telephone to a called party associated with a second telephone over a telephone network;

detecting in the telephone network that a voice channel cannot be opened between the first telephone and second telephone;

sending a signaling message from the telephone network to the first telephone that the voice channel cannot be opened;

recording a voice message from the caller to the called party at the first telephone device;

transmitting a message from the telephone network to the first telephone to indicate when the voice channel can be opened to the second telephone;

opening the voice channel from the first telephone following receipt of said message; and subsequently transmitting said recorded message to the second telephone over the open voice channel; and wherein both the first and second telephone are cellular telephones and subscribe to cellular telephone networks.

8. The method of claim 7 further comprising the steps of:

converting the recorded message at the first telephone into a data signal;

transmitting the data signal to the second telephone over a signaling channel or channels;

receiving the data signal at the second telephone over the signaling channel or channels; and converting the data signal to a voice signal for subsequent playback to the called party.

9. A voice communication method comprising:

initiating a telephone call from a first telephone to a second telephone;

in the event that a voice channel cannot be opened between the first telephone and second telephone, recording a voice message at the first telephone wherein both the first and second telephones are cellular telephones and subscribe to cellular telephone networks;

converting the recorded message into a data message or set of data messages;

transmitting the data message or set of data messages to the second telephone over a signalling channel or channels;

receiving the data message or set of data messages at the second telephone over the signalling channel or channels; and converting the data message or set of data messages to a voice signal for subsequent playback.

* * * * *